(12) United States Patent
Sato et al.

(10) Patent No.: US 7,769,122 B2
(45) Date of Patent: Aug. 3, 2010

(54) TIMING RECOVERY CIRCUIT

(75) Inventors: Masashi Sato, Kawasaki (JP); Yutaka Awata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 845 days.

(21) Appl. No.: 11/386,342

(22) Filed: Mar. 22, 2006

(65) Prior Publication Data

US 2007/0127600 A1    Jun. 7, 2007

(30) Foreign Application Priority Data

Dec. 6, 2005    (JP) .............................. 2005-351909

(51) Int. Cl.
*H03D 3/24* (2006.01)
(52) U.S. Cl. .................. 375/375; 375/376; 708/313
(58) Field of Classification Search .......... 375/216, 375/371, 375, 376; 708/300, 313
See application file for complete search history.

(56) References Cited

U.S. PATENT DOCUMENTS 5,331,583 A * 7/1994 Hara et al. .................. 708/300
5,425,060 A * 6/1995 Roberts et al. .............. 375/371
7,280,308 B2 * 10/2007 Kokami .................... 360/78.04

FOREIGN PATENT DOCUMENTS

JP    3-98309    4/1991

* cited by examiner

*Primary Examiner*—David C Payne
*Assistant Examiner*—Leon-Viet Q Nguyen
(74) *Attorney, Agent, or Firm*—Katten Muchin Rosenman LLP

(57) ABSTRACT

A timing recovery circuit capable of enhancing the reliability of timing recovery in a receiver apparatus in a communication system that employs the scheme of modulating the amplitude of a carrier wave. In the receiver apparatus which receives a transmitted signal created by modulating the amplitude of the carrier wave, and which comprises an AD converter for converting the received signal into a digital signal by sampling the received signal at an n-times oversampling rate, the timing recovery circuit which recovers a clock signal by extracting timing information from the output of the AD converter is constructed by containing therein a decimation filter for decimating the output of the AD converter down to an m-times oversampling rate (where 1<m<n), a phase difference information calculator for calculating the phase difference information from the output of the decimation filter; a loop filter for averaging the output of the phase difference information calculator, and an oscillator for generating, based on the output of the loop filter, a clock signal for controlling the sampling performed by the AD converter.

9 Claims, 7 Drawing Sheets

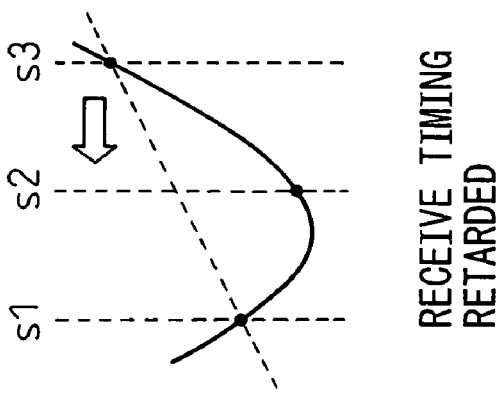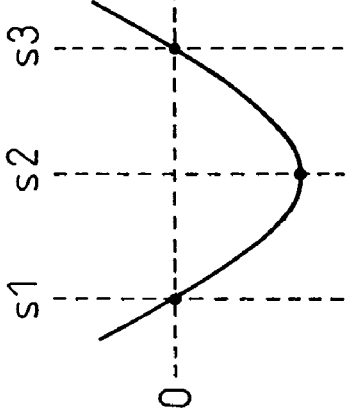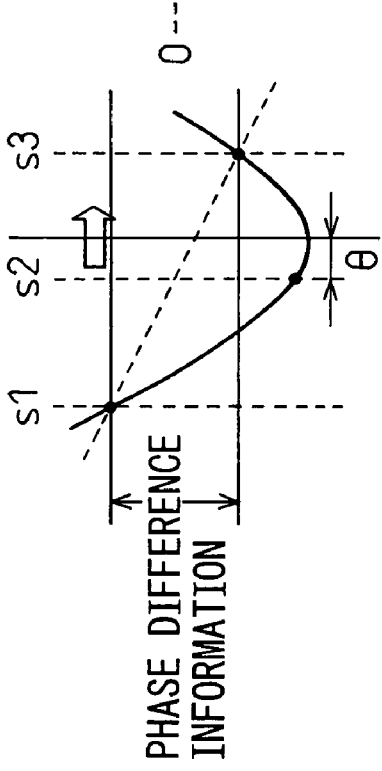

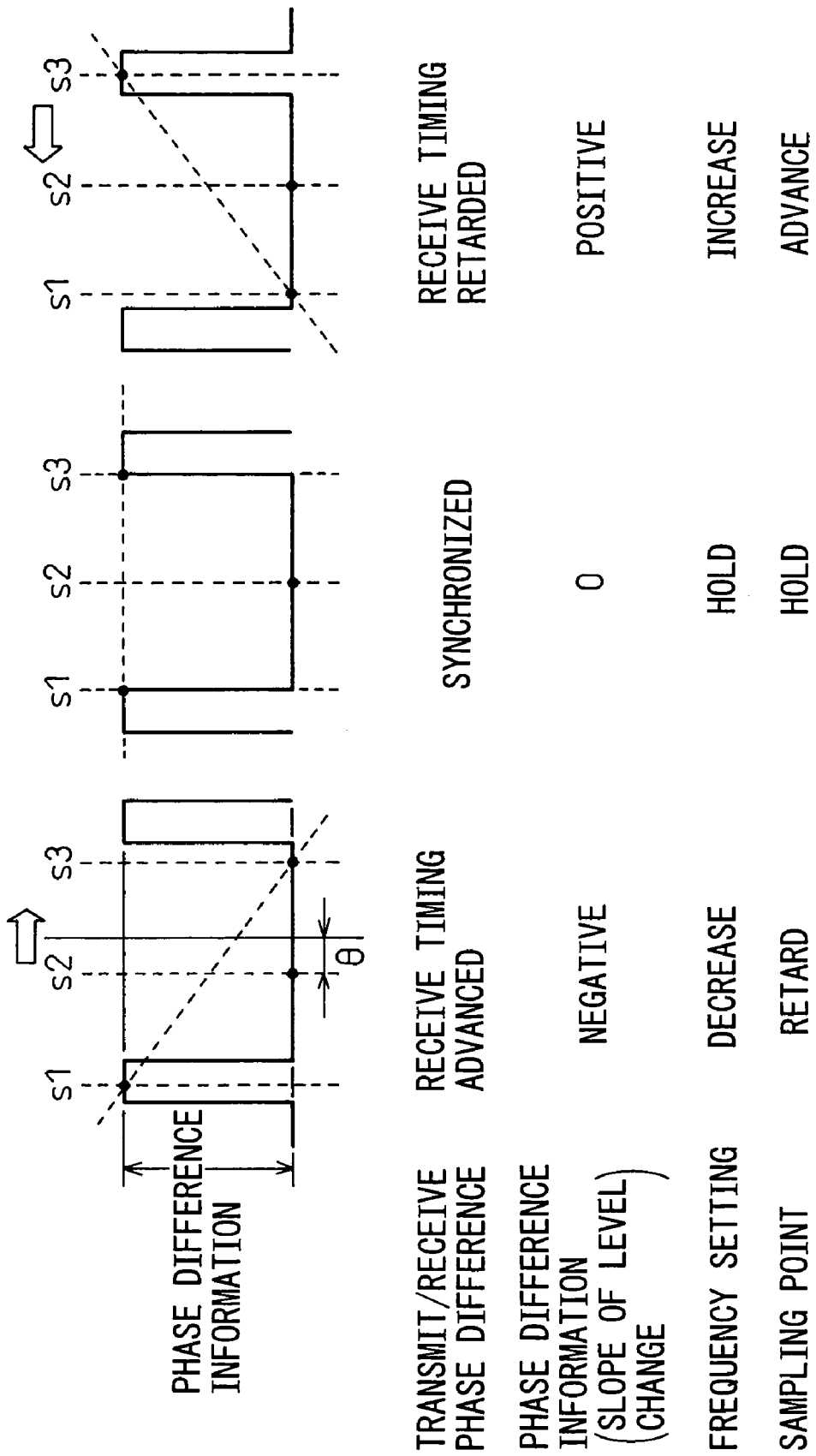

TIMING RECOVERY CIRCUIT

BACKGROUND OF THE INVENTION

1. Field of the Invention

The present invention relates to a receiver timing recovery circuit in a communication system employing the scheme of modulating the amplitude of a sine wave or a pulse train as a carrier wave.

2. Description of the Related Art

In a communication system in which a transmit signal created by modulating the amplitude of a sine wave or a pulse train as a carrier wave is transmitted from the transmitting end to the receiving end, the job that the receiving end is expected to do is to recover the original signal information. Conventionally, when sampling a high-frequency received signal in an analog/digital converter (hereinafter, sometimes referred to as an ADC), the signal is sampled at a frequency several times higher than the Nyquist frequency. This is known as oversampling. The higher the sampling frequency, the higher signal-to-noise ratio (S/N ratio) that can be achieved, but the amount of computation increases.

Undesired noise components occurring in the frequency range higher than the signal bandwidth as a result of the oversampling are removed by passing the output signal of the ADC through a low-pass filter (LPF). Then, the oversampled data is converted back to the original sampling rate; this operation is called "decimation". The decimation is accomplished using a decimator whose configuration is shown in FIG. 1. As shown, the decimator comprises a low-pass filter (called the decimation filter) and a downsampler. In the figure, Fs indicates the sampling frequency, and D designates a positive integer.

Here, the case where a timing recovery process is provided in addition to a data reconstruction process in the above communication system is considered. As the timing information is contained in the received signal, conventionally, the timing information is recovered by using a portion of the received signal converted back to the original sampling rate after oversampling. More specifically, the amplitude values of the samples adjacent on both sides of the sample used for signal decision are found, and the timing information is obtained from their difference. However, as noise is almost always superimposed on the received signal, it is difficult to extract accurate timing information from one single signal.

In Japanese Unexamined Patent Publication No. H03-098309, herein cited as a prior art document that has relevance to the present invention, there is disclosed a signal distortion correcting method for use in a digital subscriber transmission interface, wherein a received signal from a transmission line is converted by an oversampling A/D converter into high-speed digital data, and the resulting digital data sequence is passed through a plurality of low-pass comb filter stages in a decimation filter to remove frequency components higher than the basic sampling frequency, after which the data is converted, by decimation, into a data sequence operating at the basic sampling rate and, after performing echo cancellation, the transmission loss occurring due to the low-pass comb filters and the loss distortion due to the transmission line are corrected simultaneously by a digital equalizer operating at the basic sampling rate.

SUMMARY OF THE INVENTION

The present invention has been devised in view of the above problem, and an object of the invention is to provide a timing recovery circuit capable of enhancing the reliability of timing recovery in a receiver apparatus in a communication system that employs the scheme of modulating the amplitude of a carrier wave.

To achieve the above object, according to the present invention, there is provided, for use in a receiver apparatus which receives as a received signal a carrier wave amplitude-modulated by a transmitter apparatus, and which comprises an analog/digital converter for converting the received signal into a digital signal by sampling the received signal at n times the frequency of the carrier wave (n is a positive integer), a timing recovery circuit for recovering a clock signal of the transmitter apparatus by extracting phase difference information indicating a phase difference between transmit timing and receive timing, comprising: a decimation filter for decimating a frequency with which to sample an output of the analog/digital converter down to a frequency m times the frequency of the carrier wave (where m is an integer that satisfies the relation $1<m<n$); a phase difference information calculator for calculating the phase difference information from an output of the decimation filter; a loop filter for averaging an output of the phase difference information calculator; and an oscillator for generating, based on an output of the loop filter, a clock signal with which the analog/digital converter performs the sampling.

In one preferred mode, the carrier wave is a sine wave.

In another preferred mode, the carrier wave is a pulse train.

According to the present invention, there is also provided a receiver apparatus for receiving, as a received signal, a carrier wave amplitude-modulated by a transmitter apparatus, comprising: an analog/digital converter for converting the received signal into a digital signal by sampling the received signal at n times the frequency of the carrier wave (n is a positive integer); and a timing recovery circuit for recovering a clock signal of the transmitter apparatus by extracting phase difference information indicating a phase difference between transmit timing and receive timing, wherein the timing recovery circuit comprises: a decimation filter for decimating a frequency with which to sample an output of the analog/digital converter down to a frequency m times the frequency of the carrier wave (where m is an integer that satisfies the relation $1<m<n$); a phase difference information calculator for calculating the phase difference information from an output of the decimation filter; a loop filter for averaging an output of the phase difference information calculator; and an oscillator for generating, based on an output of the loop filter, a clock signal with which the analog/digital converter performs the sampling.

According to the present invention, there is also provided, for use in a receiver apparatus which receives, as a received signal, a carrier wave amplitude-modulated by a transmitter apparatus and which comprises an analog/digital converter for converting the received signal into a digital signal by sampling the received signal at n times the frequency of the carrier wave (n is a positive integer), a timing recovery method for recovering a clock signal of the transmitter apparatus by extracting phase difference information indicating a phase difference between transmit timing and receive timing, comprising the steps of: causing an output of the analog/digital converter to pass through a decimation filter for decimating a frequency with which to sample the output down to a frequency m times the frequency of the carrier wave (where m is an integer that satisfies the relation $1<m<n$); calculating the phase difference information from an output of the decimation filter; causing an output indicating a result of the calculation to pass through a-loop filter; and operating an oscillator to generate, based on an output of the loop filter, a clock signal with which the analog/digital converter performs the sampling.

The timing recovery circuit according to the present invention enhances the reliability of timing recovery in a communication system that employs the scheme of modulating the amplitude of the carrier wave.

BRIEF DESCRIPTION OF THE DRAWINGS

Further features and advantages of the present invention will be apparent from the following description with reference to the accompanying drawings, in which:

FIGS. 5A, 5B, and 5C are diagrams showing an overview of how phase difference information is calculated for the case where the carrier wave is a sine wave;

FIGS. 6A, 6B, and 6C are diagrams showing an overview of how phase difference information is calculated for the case where the carrier wave is a pulse train.

DESCRIPTION OF THE PREFERRED EMBODIMENTS

Figure 1:
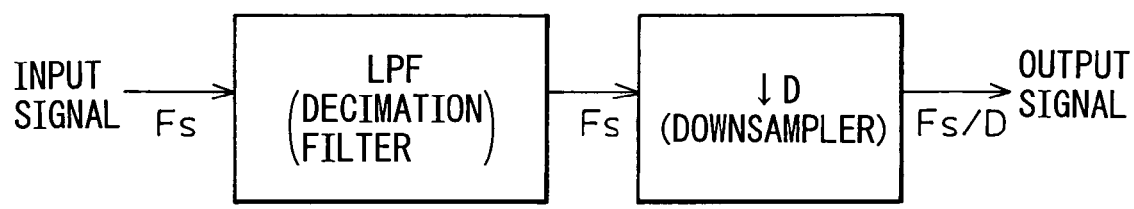
FIG. 1 is a block diagram showing the configuration of a conventional decimator.
Figure 2:
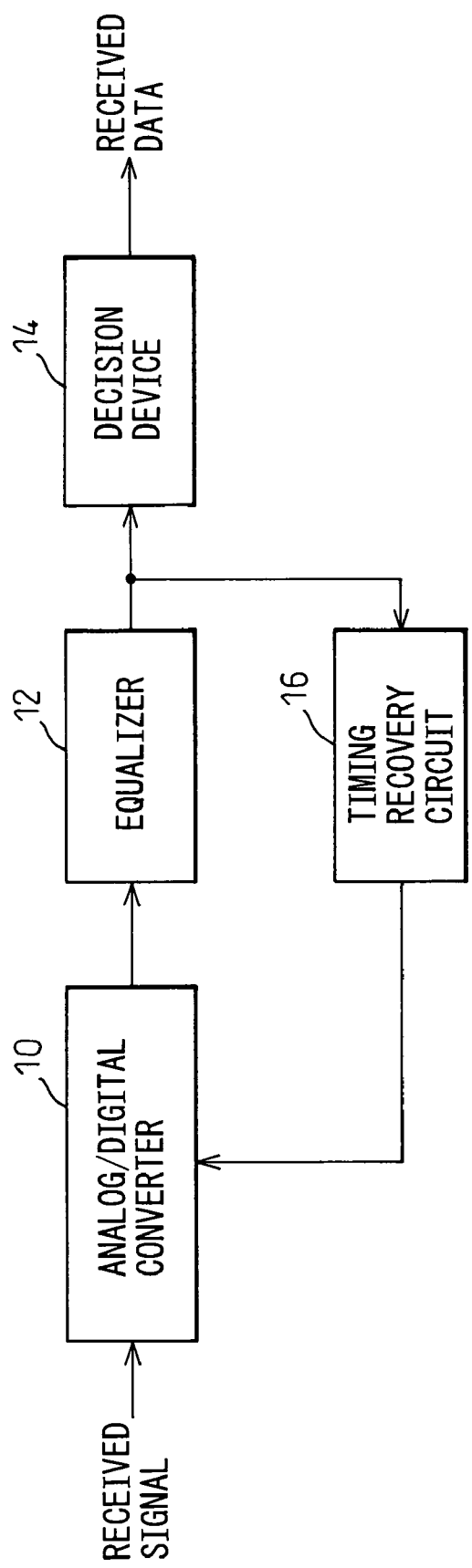
FIG. 2 is a block diagram showing the configuration generally employed for a receiver apparatus in a communication system that employs the scheme of modulating the amplitude of a carrier wave.

Embodiments of the present invention will be described below with reference to the accompanying drawings. FIG. 2 is a block diagram showing the configuration generally employed for a receiver apparatus in a communication system that employs the scheme of modulating the amplitude of a carrier wave. As shown, the receiver apparatus generally comprises an analog/digital converter (ADC) 10, an equalizer 12, a decision device 14, and a timing recovery circuit 16. The timing recovery circuit 16 detects timing information from the received signal and adjusts the frequency and phase of the receiver clock.

Figure 3:
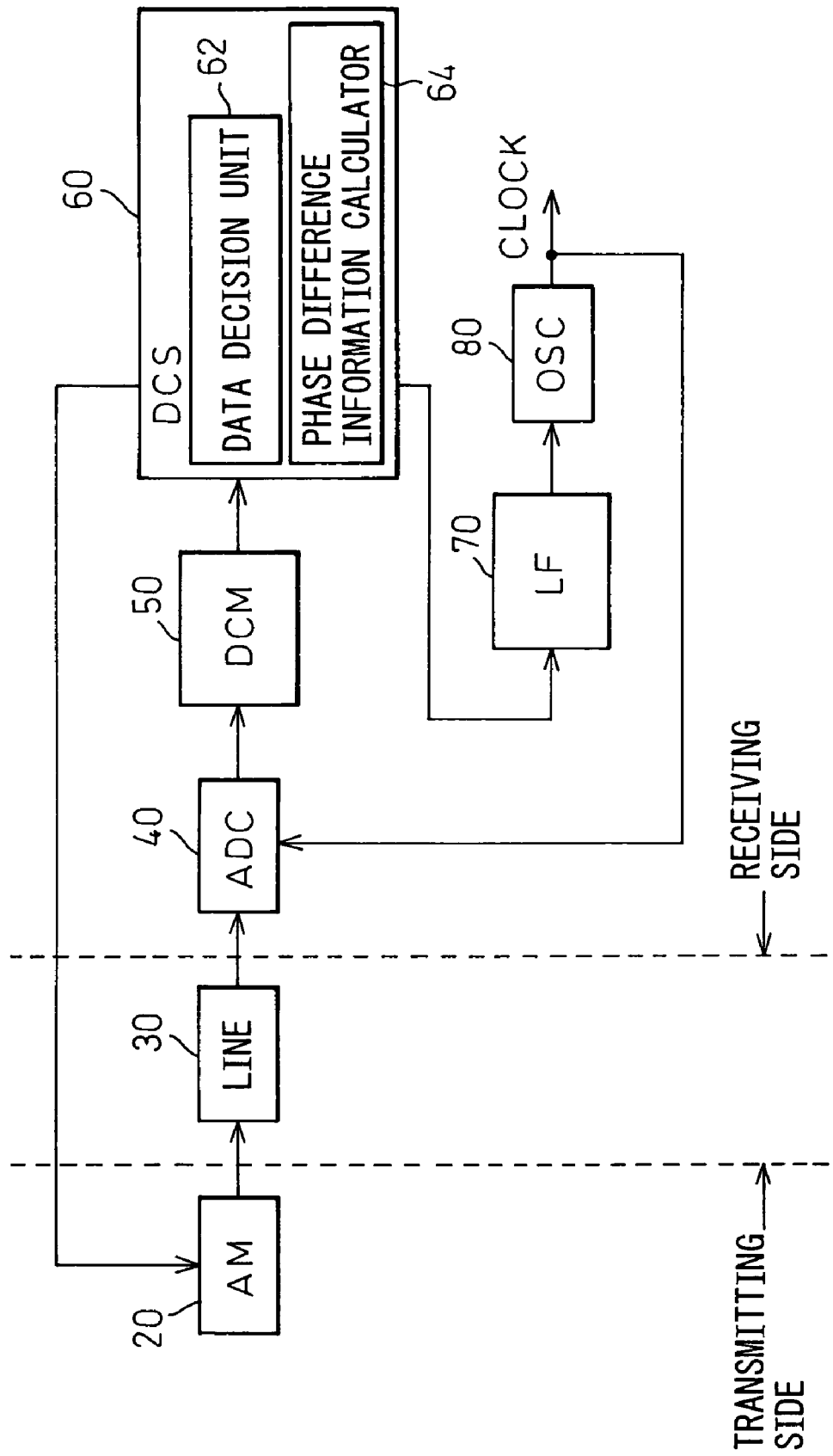
FIG. 3 is a block diagram showing the configuration of a timing recovery circuit according to the present invention along with its peripheral circuits.

FIG. 3 is a block diagram showing the configuration of a timing recovery circuit according to the present invention along with its peripheral circuits; here, a decimator 50, a phase difference information calculator 64, a loop filter 70, and an oscillator 80 constitute the timing recovery circuit. An amplitude modulator (AM) 20 at the transmitter side generates a transmit signal by modulating the amplitude of a sine wave or a pulse train as a carrier wave by the original signal (modulating signal), and the transmit signal is transmitted to the receiving end via a transmission line 30.

An analog/digital converter (ADC) 40 at the receiver side samples the signal received via the transmission line 30 and converts it into a digital signal. The sampling rate used here is an oversampling rate which is, for example, eight times the Nyquist frequency (basic sampling frequency). The data obtained by the oversampling is fed into the decimator (DCM) 50.

In the present invention, the decimation factor used for timing recovery is set lower than the usually used one. Usually, the received signal sampled at an n-times oversampling rate (n is a positive integer, for example, 8) is decimated down to a unity sampling rate; in contrast, in the present invention, the decimation is not performed down to that level, but is limited to a level equivalent to m-times oversampling (m is an integer that satisfies the relation 1<m<n, for example, 4), and the thus decimated signal is used for timing recovery. Prior to the decimation, the signal is averaged by passing it through an LPF for noise elimination. The effect of noise can thus be reduced.

Figure 4:
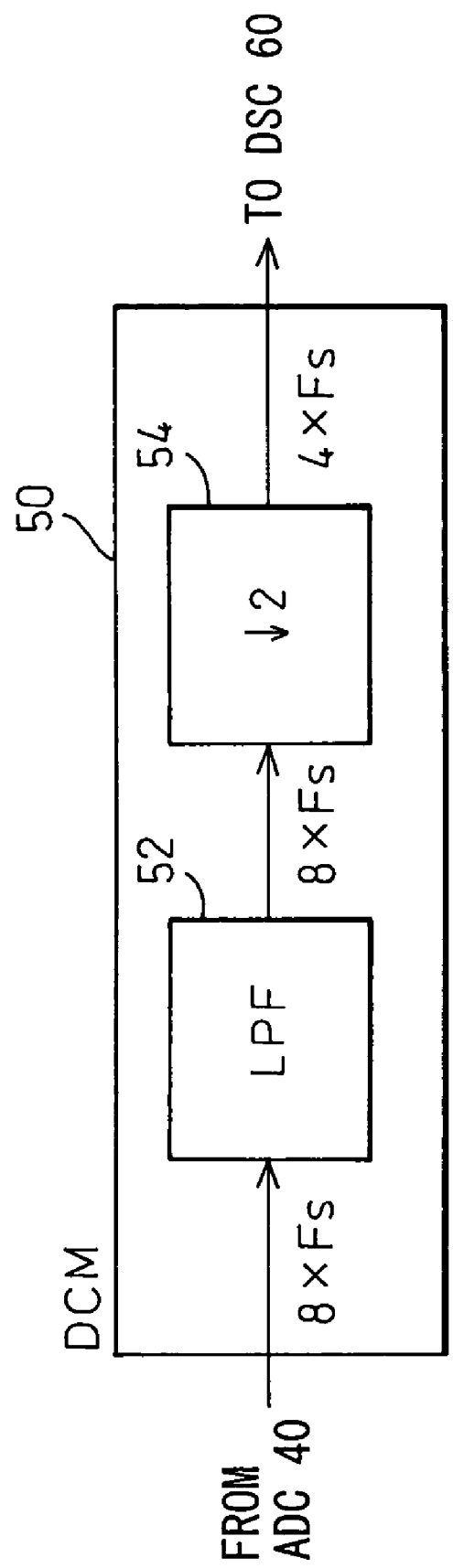
FIG. 4 is a block diagram showing the configuration of a decimator in the timing recovery circuit.

More specifically, the decimator (DCM) 50 is constructed as shown in the block diagram of FIG. 4. As shown, the decimator 50 includes an LPF 52 which eliminates noise by averaging the input, and a downsampler 54 which reduces the frequency by a factor of two. With this decimator, an oversampling rate of 8, for example, is decimated to an oversampling of 4. The benefit of not reducing the rate to a unity sampling rate will be described later.

Turning back to FIG. 3, the output of the decimator 50 is fed into a decision device (DSC) 60. The decision device 60 comprises a data decision unit 62 for making a decision on received data and a phase difference information calculator 64 for obtaining phase difference information indicating a phase difference between transmit timing and receive timing. Oversampled data contains the timing information indicating the position at which the decision is to be made; therefore, using this information, the phase difference information calculator 64 calculates the phase difference information. Its details will be described later.

The phase difference information from the phase difference information calculator 64 is fed into the loop filter (LF) 70. The loop filter 70 comprises a low-pass filter, and averages the phase difference information. The averaged phase difference information is input to the oscillator (OSC) 80. The oscillator 80 is an oscillator whose frequency of oscillation varies in accordance with its input, and supplies a clock signal to the analog/digital converter (ADC) 40 and other blocks. Thus, the analog/digital converter (ADC) 40, the decimator 50, the decision device 60, the loop filter 70, and the oscillator 80 together form a PLL (phase-locked loop) circuit.

FIGS. 5A, 5B, and 5C are diagrams showing an overview of how the phase difference information is calculated by the phase difference information calculator 74 in the case where the carrier wave is a sine wave. For the phase difference between transmit timing and receive timing, FIG. 5A shows the case where the receive timing is advanced in phase, FIG. 5B shows the case where the timing is synchronized, and FIG. 5C shows the case where the receive timing is delayed in phase; here, the time is plotted along the abscissa and the signal level (amplitude value) along the ordinate. Further, s1, s2, and s3 indicate sampling points; of these sampling points, the sample value taken at s2 is used for signal decision. The phase difference information is obtained from the difference between the sample values at s1 and s3 on both sides of the sample used for signal decision.

More specifically, in the case of FIG. 5A, the signal level changes from positive to negative between s1 and s3, and its difference is taken as the phase difference information which indicates that the frequency should be set lower to retard the sampling point. In the case of FIG. 5B, the signal level remains unchanged at 0 between s1 and s3, and the difference, i.e., 0, is taken as the phase difference information which indicates that the frequency setting should be held as is, that is, there is no need to adjust the sampling point. On the other hand, in the case of FIG. 5C, the signal level changes from negative to positive between s1 and s3, and its difference is taken as the phase difference information which indicates that the frequency should be set higher to advance the sampling point.

FIGS. 6A, 6B, and 6C are diagrams showing an overview of the phase difference information calculation for the case where the carrier wave is a pulse train. These figures show that the phase difference information can be calculated in the same manner as in the case where the carrier wave is a sine wave (FIGS. 5A, 5B, and 5C).

Figure 7A:
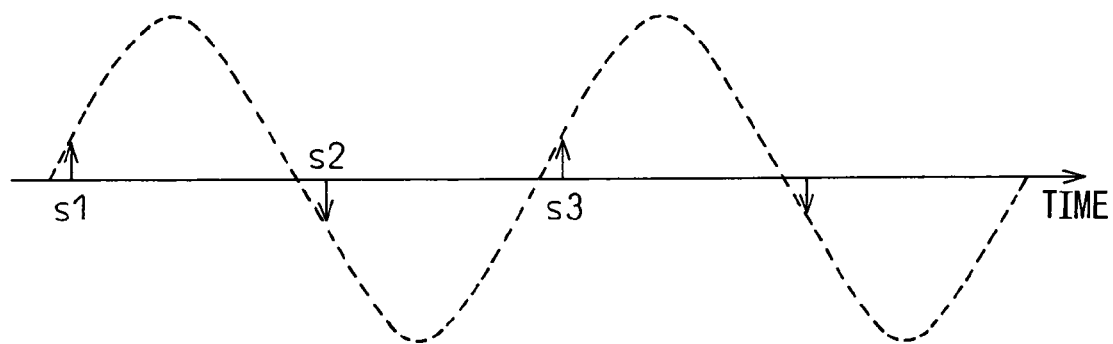
FIGS. 7A and 7B are diagrams for explaining how the accuracy of the phase difference information calculation is enhanced according to the present invention.
Figure 7B:
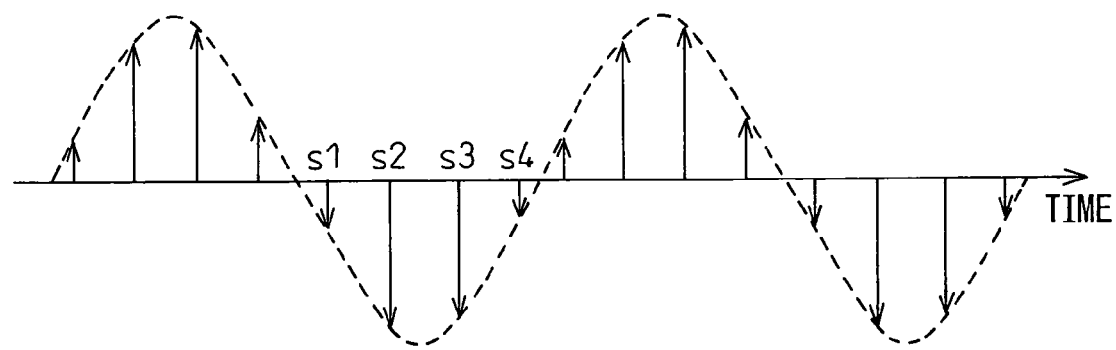

FIGS. 7A and 7B are diagrams for explaining how the accuracy of the phase difference information calculation is enhanced according to the present invention. As earlier described, the downsampler 54 in the decimator 50 decimates the oversampling rate of 8 down to 4. The benefit of decimating the rate only down to 4 it that, as a plurality of data samples are available for each pulse, the effect of noise which may be superimposed on the received pulse can be reduced by averaging.

For example, consider the case of one sample per pulse (per symbol). As shown in FIG. 7A, the signal level is the same at sample points s1 and s3 adjacent on both side of a given sample point s2, that is, the signal level difference as the phase difference information is 0. As a result, if there is a phase difference between transmit timing and receive timing, as shown in FIG. 7A, when the frequency is set correctly, the phase difference may not be detected.

On the other hand, consider the case of four samples per pulse (per symbol). As shown in FIG. 7B, there are four sample points s1, s2, s3, and s4 for one pulse (one symbol), of which the sample point s2 at which the absolute value of the signal level is the largest is used for signal decision; then, the signal level difference between s1 and s3 adjacent on both sides of s2 is obtained as the phase difference information. As a result, when the frequency is set correctly, if there is a phase difference, the phase difference can be detected, and a correction can be made to establish phase synchronization.

Generally, the received signal used in blocks other than the timing recovery process requires decimation down to the unity sampling rate but, by employing a lower decimation factor, for example, a decimation from 8 to 4, only for the received signal used for timing recovery, the accuracy of the timing recovery can be enhanced.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A timing recovery circuit, for use in a receiver apparatus which receives as a received signal a carrier wave amplitude-modulated by a transmitter apparatus and which comprises an analog/digital converter for converting said received signal into a digital signal by sampling said received signal at n times the frequency of said carrier wave, where n is a positive integer, for recovering a clock signal of said transmitter apparatus by extracting phase difference information indicating a phase difference between transmit timing and receive timing, comprising:

a decimation filter for directly inputting an output of said analog/digital converter and for decimating a frequency with which to sample the output of said analog/digital converter down to a frequency m times the frequency of said carrier wave, where m is an integer that satisfies the relation 1 <m <n;

a phase difference information calculator for directly inputting an output of said decimation filter and for calculating said phase difference information from the output of said decimation filter, wherein there are three sample points for one symbol, of which a sample point at which an absolute value of a signal level is largest is used as a reference sample point, and the phase difference information is obtained from a difference between sample values at sample points on both sides of the reference sample point;

a loop filter for averaging an output of said phase difference information calculator; and an oscillator for generating, based on an output of said loop filter, a clock signal with which said analog/digital converter performs said sampling.

2. A timing recovery circuit as claimed in claim 1, wherein said carrier wave is a sine wave.

3. A timing recovery circuit as claimed in claim 1, wherein said carrier wave is a pulse train.

4. A receiver apparatus for receiving, as a received signal, a carrier wave amplitude-modulated by a transmitter apparatus, comprising: an analog/digital converter for converting said received signal into a digital signal by sampling said received signal at n times the frequency of said carrier wave, where n is a positive integer; and a timing recovery circuit for recovering a clock signal of said transmitter apparatus by extracting phase difference information indicating a phase difference between transmit timing and receive timing, wherein said timing recovery circuit comprises:

a decimation filter for directly inputting an output of said analog/digital converter and for decimating a frequency with which to sample the output of said analog/digital converter down to a frequency m times the frequency of said carrier wave, where m is an integer that satisfies the relation 1 <m <n;

a phase difference information calculator for directly inputting an output of said decimation filter and for calculating said phase difference information from the output of said decimation filter, wherein there are three sample points for one symbol, of which a sample point at which an absolute value of a signal level is largest is used as a reference sample point, and the phase difference information is obtained from a difference between sample values at sample points on both sides of the reference sample point;

a loop filter for averaging an output of said phase difference information calculator; and an oscillator for generating, based on an output of said loop filter, a clock signal with which said analog/digital converter performs said sampling.

5. A receiver apparatus as claimed in claim 4, wherein said carrier wave is a sine wave.

6. A receiver apparatus as claimed in claim 4, wherein said carrier wave is a pulse train.

7. A timing recovery method, for use in a receiver apparatus which receives as a received signal a carrier wave amplitude-modulated by a transmitter apparatus and which comprises an analog/digital converter for converting said received signal into a digital signal by sampling said received signal at n times the frequency of said carrier wave, where n is a positive integer, for recovering a clock signal of said transmitter apparatus by extracting phase difference information indicating a phase difference between transmit timing and receive timing, comprising:

causing an output of said analog/digital converter to be directly input to and to pass through a decimation filter for decimating a frequency with which to sample said output down to a frequency m times the frequency of said carrier wave, where m is an integer that satisfies the relation $1 < m < n$;

calculating said phase difference information from a direct output of said decimation filter, wherein there are three sample points for one symbol, of which a sample point at which an absolute value of a signal level is largest is used as a reference sample point, and the phase difference information is obtained from a difference between sample values at sample points on both sides of the reference sample point;

causing an output indicating a result of said calculation to pass through a loop filter; and operating an oscillator to generate, based on an output of said loop filter, a clock signal with which said analog/digital converter performs said sampling.

8. A timing recovery method as claimed in claim 7, wherein said carrier wave is a sine wave.

9. A timing recovery method as claimed in claim 7, wherein said carrier wave is a pulse train.

* * * * *